(12) United States Patent
Date et al.

(10) Patent No.: US 6,798,485 B2
(45) Date of Patent: Sep. 28, 2004

(54) LIQUID CRYSTAL DISPLAY DEVICE HAVING PARTICULAR METAL REFLECTIVE FILM

(75) Inventors: Takashi Date, Fukushima-ken (JP); Toshiaki Hoshino, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/334,387

(22) Filed: Jun. 16, 1999

(65) Prior Publication Data

US 2003/0164907 A1 Sep. 4, 2003

(30) Foreign Application Priority Data

Jun. 17, 1998 (JP) .............................. 10-170373

(51) Int. Cl.⁷ ...................... G02F 1/1339; G02F 1/1335
(52) U.S. Cl. ...................... 349/153; 349/190; 349/154; 349/113
(58) Field of Search ................. 349/154, 153, 349/189, 190, 113

(56) References Cited

U.S. PATENT DOCUMENTS

| | | | | |
|---|---|---|---|---|
| 4,037,930 A | * | 7/1977 | Matsuyama et al. | 350/160 |
| 4,466,701 A | * | 8/1984 | Ogata et al. | 350/336 |
| 4,610,510 A | * | 9/1986 | Funada et al. | 350/334 |
| 4,640,583 A | * | 2/1987 | Hoshikawa et al. | 350/343 |
| 4,832,467 A | * | 5/1989 | Miyagi et al. | 350/357 |
| 5,684,556 A | * | 11/1997 | Shimamune | 349/158 |
| 5,689,352 A | * | 11/1997 | Kishigami | 359/88 |
| 5,893,625 A | * | 4/1999 | Tamatani et al. | 349/189 |
| 5,966,194 A | * | 10/1999 | Hu et al. | 349/153 |
| 6,099,672 A | * | 8/2000 | Yamazaki et al. | 156/109 |

FOREIGN PATENT DOCUMENTS

JP          6-273779          *  9/1994

* cited by examiner

*Primary Examiner*—Robert H. Kim
*Assistant Examiner*—Mike Qi
(74) *Attorney, Agent, or Firm*—Brinks Hofer Gilson & Lione

(57) ABSTRACT

The present invention has an object to provide a liquid crystal display device which, when a liquid crystal injection portion is sealed and stopped up with a resin, makes it possible to precisely and easily perform the operation and makes it possible to detect defective liquid crystal injection. The liquid crystal display device comprises one substrate on which a metal reflective film is formed, the other substrate arranged opposite to the substrate, a sealing material, interposed between the pair of substrates, for surrounding, together with the substrates, a liquid crystal injection space formed between the substrates, and a liquid crystal sealed into the liquid crystal injection space, and is characterized in that a liquid crystal injection portion is formed on the sealing material, a plurality of display electrodes are formed on a substrate surface in a region in which the liquid crystal is sealed, and, on one of the substrates, outside the display electrode forming region, an unformed portion of the metal reflective film is formed on a portion including the injection portion of the injection material.

5 Claims, 9 Drawing Sheets

LIQUID CRYSTAL DISPLAY DEVICE HAVING PARTICULAR METAL REFLECTIVE FILM

BACKGROUND OF THE INVENTION

1. Field of the Invention

The present invention relates to a liquid crystal display device with a metal reflective film and, more particularly, to a structure in which, when a liquid crystal display device is manufactured by sealing a liquid crystal injection hole after a liquid crystal is injected between substrates, an operation of sealing the injection hole can be reliably performed.

2. Description of the Related Art

As shown in FIG. 7 as a conventional configuration of a liquid crystal display device, a liquid crystal display device 3 obtained by sealing a liquid crystal between a pair of substrates 1 and 2 is known. In the exemplified liquid crystal display device 3, a sealing material 4 consisting of a resin and annularly arranged along the peripheral portions of the substrates 1 and 2 is interposed between the substrates 1 and 2, and a liquid crystal is sealed in a space surrounded by the sealing material 4 and the substrates 1 and 2.

Projection portions 5 obtained by partially projecting the sealing material 4 on the center side of one end face of the substrates 1 and 2 (on the center side of the right end face in FIG. 7) toward the end face side of the substrates 1 and 2 are formed to be spaced apart from each other. These projection portions 5 are caused to reach the end faces of the substrates 1 and 2 to form a liquid crystal injection portion 6. A resin is filled in the liquid crystal injection portion 6 to form a sealed portion 7, and the liquid crystal injection portion 6 is stopped up.

When the liquid crystal display device 3 shown in FIG. 7 is of a reflection type, as shown in FIG. 8, a reflective layer 8 is formed on the rear surface side of the substrate 2.

When operations of injecting a liquid crystal and sealing the liquid crystal are performed to the reflection type liquid crystal display device 3, the operations are performed by, e.g., the procedures described below.

Pairs of substrates 1 and 2, as shown in FIG. 9, obtained in a state in which no liquid crystal is injected and before a sealed portion 7 is formed (i.e., the substrates 1 and 2 in which the injection portion 6 of the sealing material 4 is open) and a vessel 11 in which a liquid crystal 10 is saved are prepared separately from each other.

The pairs of substrates 1 and 2 are made upside down and kept above the vessel 11. This structure as a whole is put in a vacuum atmosphere such as an evacuated furnace. The pairs of substrates 1 and 2 are moved downward to dip the peripheral portions of the liquid crystal injection portions 6 of the substrates 1 and 2 into the liquid crystal 10. In this case, since a gap between each pair of substrates 1 and 2 is very small, the liquid crystal 10 can be slightly drawn into the gap between the substrates 1 and 2 from the liquid crystal injection portion 6 by capillary phenomenon.

Upon completion of this operation, when the atmosphere around the vessel 11 and the pairs of substrates 1 and 2 is returned from the vacuum atmosphere to the atmospheric atmosphere, the liquid crystal 10 can be drawn into the entire gap between the substrates 1 and 2 by using a pressure difference between the pressure in the vacuum state between the substrates 1 and 2 and the atmospheric pressure outside the substrates 1 and 2.

Upon completion of the liquid crystal drawing operation into the gaps between the pairs of substrates 1 and 2, operations of stopping up and sealing the liquid crystal injection portions 6 are performed.

The operations are performed as follows. That is, as shown in FIG. 10 of a prior art method, the pairs of substrates 1 and 2 subjected to the liquid crystal drawing operation are uprightly arrayed such that the liquid crystal injection portions 6 face the upper side. The distal end of a resin injection nozzle 12 is sequentially positioned at the openings of the liquid crystal injection portions 6 illuminated with a lighting tool 13, and a resin is injected from the distal end of the resin injection nozzle 12. A resin sticking out of each of the injection portions 6 is wiped off, and the resin of the injection portion 6 is solidified to form the sealed portion 7.

However, since the operation of injecting the resin into the liquid crystal injection portion 6 of each pair of substrates 1 and 2 by using the resin injection nozzle 12 is an important operation which may cause a liquid crystal to leak when erroneous injection such as offsetting of an injection position, the operation must be strictly performed. When the liquid crystal injection portion 6 is illuminated with the lighting tool 13, there is a problem in that the position of the liquid crystal injection portion 6 cannot be easily detected.

This problem is caused by the following reason. That is, when the substrates 1 and 2 are used in a reflection type liquid crystal display device, the reflective film 8 is formed on the entire surface of the rear surface side of the substrates 2. Because the liquid crystal injection portion 6 of another pair of substrates 1 and 2 located behind the substrate 2 in an arrangement which pairs of substrates 1 and 2 are arrayed as shown in FIG. 10, the liquid crystal injection portion 6 with the reflective layer 8 is shielded by the substrate 2 on the front side. For this reason, an operator cannot easily recognize a precise position of the liquid crystal injection portion 6. Position check must be performed by an image analyzer such as a television camera. All the positions of the liquid crystal injection portions 6 of the pairs of substrates 1 and 2 in an array state cannot be checked from the outside because each reflective layer 8 on the front side shields each liquid crystal injection portion 6 on the rear side. In addition, even if injection positions can be precisely recognized, filing of a resin may not be satisfactorily performed depending on an injection state of the resin. An amount of injection may be so excessive that the resin sticking out of the liquid crystal injection portion 6 may be adhered to the peripheral portion of the liquid crystal injection portion 6.

Uneven injection may be caused when a liquid crystal is injected into the pairs of substrates 1 and 2 as shown in FIG. 9. In a vacuum atmosphere, it is difficult to completely recognize and check whether the liquid crystal is filled into the pairs of substrates 1 and 2. Whether the liquid crystal injection process is completed is typically recognized by a time parameter of a pressure-reduction time when a vacuum atmosphere is made, and when a predetermined period of time has elapsed, completion of the injection is determined. However, if defective liquid crystal injection occurs for some reason, substrates 1 and 2 in which the defective liquid crystal injection occurs cannot be detected in the resin sealing process shown in FIG. 10. Therefore, a defective product may be manufactured.

SUMMARY OF THE INVENTION

The present invention has been made in consideration of the above circumstances, and has as its object to provide a liquid crystal display device which, when a liquid crystal injection portion is sealed and stopped up with a resin after a liquid crystal injection operation, makes it possible to easily and precisely perform the operation and makes it possible to easily detect defective liquid crystal injection.

In order to solve the above problems, the present invention provides a liquid crystal display device comprising one substrate on which a metal reflective film is formed, the other substrate arranged opposite to the substrate, a sealing material, interposed between the pair of substrates, for surrounding, together with the substrates, a liquid crystal injection space formed between the substrates, and a liquid crystal sealed into the liquid crystal injection space, characterized in that a liquid crystal injection portion is formed on the sealing material, a plurality of display electrodes are formed on a substrate surface in a region in which the liquid crystal is sealed, and, on one of the substrates, outside the display electrode forming region, an unformed region of the metal reflective film is formed on a portion including the injection portion of the sealing material.

Since the unformed region of the reflective film is formed on the portion including the injection portion of the sealing material, the position of the injection portion can be easily and reliably checked without being disturbed by the reflective film from the outside of the rear side of the reflective film. Therefore, when operations of uprightly arraying a plurality of pairs of substrates, sequentially injecting a resin into a plurality of injection portions, and stopping up the injection portions are performed, the positions of the injection portions can be checked without being disturbed by the reflective films of the other adjacent substrates. Therefore, since the positions of the injection portions can be precisely checked by the region injection portions, an operation of stopping up the injection portions can be reliably performed. In addition, even if defective injection of a liquid crystal occurs, substrates in which the detective injection occurs can be easily detected.

The metal reflective film may employ either one of a structure in which the metal reflective film is additionally formed on one substrate as an independent film and a structure in which the metal reflective film is incorporated in the substrate to be integrated. The sealing material consists of a resin, and is formed on the opposite surface sides of the substrates by a method such as printing. The unformed region of the metal reflective film can be formed at an arbitrary position by the following manner. That is, the metal reflective film is formed by a film forming method after a resist is formed on a substrate, and the resist is peeled from the substrate.

The present invention provides a liquid crystal display device characterized in that, on one substrate, on which a metal reflective film is formed, of a pair of substrates which hold a liquid crystal therebetween, drawn electrodes of the display electrodes are formed at the edges of the substrates outside a region in which a plurality of display electrodes are formed on substrate surfaces in a region which holds the liquid crystal therebetween, and an unformed portion of the metal reflective film is formed in the drawn electrode forming region.

When the unformed portion of the metal reflective film is formed in the region in which the drawn electrodes are formed, the drawn electrodes can be easily and reliably formed without being disturbed by the metal reflective film, and the terminals of a drive IC or the like can be easily and reliably connected. In addition, since the positions of terminal connection portions can be checked without being disturbed by the metal reflective film, connection of the terminal connection portions can be easily checked without being shielded by the reflective film.

The present invention further provides a liquid crystal display device comprising one substrate on which a metal reflective film is formed, the other substrate arranged opposite to the substrate, a sealing material, interposed between the pair of substrates, for surrounding, together with the substrates, a liquid crystal injection space formed between the substrates, and a liquid crystal sealed in the liquid crystal injection space, characterized in that a liquid crystal injection portion is formed on the sealing material, a plurality of display electrodes are formed on a substrate surface in a region in which the liquid crystal is sealed, a first drawn electrode for a display electrode for one of the substrates and a second drawn electrode for a display electrode of the other of the substrates are formed at the edge of one of the substrates, electrode connection means is arranged on the sealing means, the second drawn electrode and the display electrode of the other of the substrates are connected to each other by the electrode connection means, and an unformed portion of the metal reflective film is formed in a region in which the second drawn electrode and the display electrode of the other of the substrates are connected to each other on the sealing material.

In the structure in which the second drawn electrode of one of the substrates is connected to the display electrode of the other of the substrates through the electrode connection means of the sealing material, since no metal reflective film is formed on the connection portion between these electrodes, the drawn electrodes can be easily formed or connected, and the drawn electrode portion can be easily checked without being shielded by the metal reflective film.

The liquid crystal display device may have a configuration characterized in that, on one of the substrates, outside the display electrode forming region, an unformed region of the metal reflective film is formed on a portion including the injection portion of the sealing material.

Since the unformed region of the reflective film is formed on the portion including the injection portion of the sealing material, the position of the injection portion can be easily checked from the outside. Therefore, when operations of uprightly arraying a large number of substrates, sequentially injecting a resin into a large number of injection portions, and stopping up the injection portions is performed, the positions of the injection portions can be easily seen without being disturbed by the reflective films of the other adjacent substrates. For this reason, the operation of stopping up the injection portion by injection of a resin can be easily and reliably performed.

The liquid crystal display device may have a configuration characterized in that, on one of the substrates, outside the display element forming region, an unformed portion of the metal reflective film is formed in the drawn electrode forming region.

The electrode connection means arranged on the sealing material preferably consists of conductive particles added to the region constituting the sealing material.

If a sealing material has a configuration in which conductive particles are diffused in a resin, when one substrate and the other substrate are brought into airtight contact with each other to sandwich the sealing material, an electrode formed on one substrate and an electrode formed on the other substrate are connected through the conductive particles of the sealing material. Of the conductive particles of the sealing material, conductive particles sandwiched by the electrodes of a pair of substrates, i.e., conductive particles existing in the direction of the substrate thickness, are sandwiched by the electrodes of the pair of substrates to be in contact with these electrodes, so that these electrodes are electrically connected to each other. However, the conductive particles existing in the direction of the substrate surface are spaced apart from each other. For this reason, electrodes adjacent to each other in the direction of the substrate surface are not short-circuited. Therefore, electrodes adjacent to each other on the same substrate are not short-circuited, and only electrodes which are opposite to each other and must be connected to each other can be reliably connected to each other.

In addition, since a structure having the metal reflective film is incorporated includes the structure in which the conductive particles diffused in the sealing material are sandwiched by the opposing substrates, when the conductive particles are pressed on both the substrates, the conductive particles may break through laminate films formed on portions of the sealing material which are in contact with the substrates. In this case, in a structure in which connection is made on a drawn electrode connection portion by the conductive particles in the sealing material, if a metal reflective film exists on the connection portion, the conductive particles may reach the metal reflective film to short-circuit the drawn electrode to the metal reflective film. However, such a short circuit can be prevented from being made by forming the unformed region of the metal reflective film on the drawn electrode connection portion.

BRIEF DESCRIPTION OF THE DRAWINGS

FIGS. 5A and 5B include partial enlarged sectional views of the liquid crystal display device according to the embodiment of FIG. 4, in which FIG. 5A is a sectional view showing a conductive particle diffusion state in which conductive particles do not reach a resin layer, and FIG. 5B is a sectional view showing a conductive particle diffusion state in which conductive particles reach the resin layer;

FIGS. 6A and 6B include a plan view and a sectional view showing electrode connection states in the structures shown in FIGS. 5A and 5B, in which FIG. 6A is a plan view showing an electrode connection state in the structure shown in FIG. 5A, and FIG. 6B is a partial enlarged sectional view showing a liquid crystal display device having a structure in which an unformed region of a metal reflective film is not formed;

FIGS. 7 and 8 is a side view of the liquid crystal display device shown in FIG. 7;

DESCRIPTION OF THE PREFERRED EMBODIMENTS

Embodiments of the present invention will be described below in detail.

Figure 1:
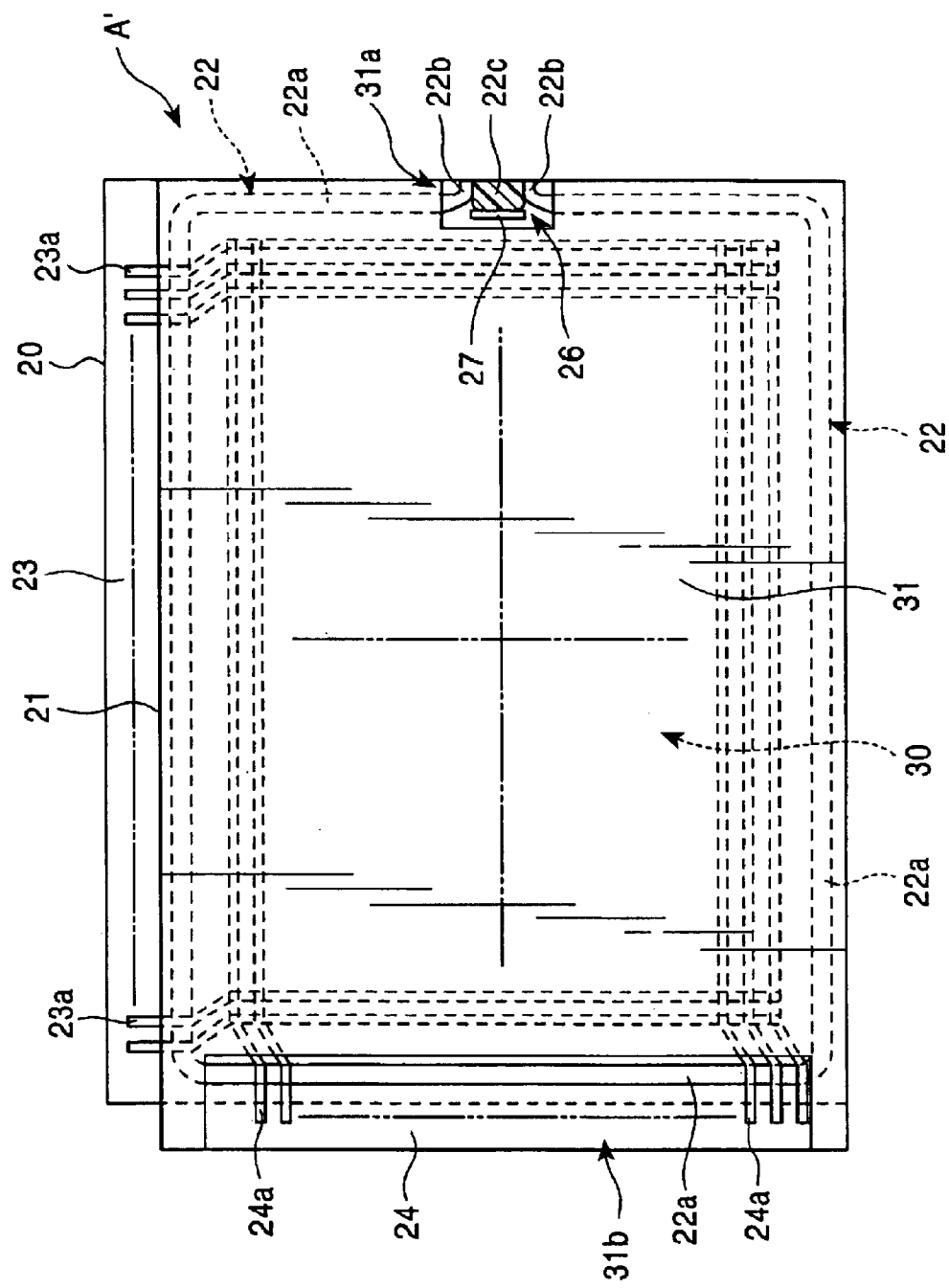
FIG. 1 is a side view showing a liquid crystal display device according to the first embodiment of the present invention.

FIG. 1 shows the first embodiment obtained by applying the present invention to a simple matrix drive type liquid crystal display device. A liquid crystal display device A' shown in FIG. 1 is formed such that a pair of transparent rectangular substrates 20 and 21 are integrated with each other to interpose a sealing material 22 therebetween.

In the configuration shown in FIG. 1, the substrate 20 is generally called an upper substrate, and the substrate 21 is generally called a lower substrate. As shown in FIG. 1, when the substrates 20 and 21 are made laterally upright such that the substrates 21 and 20 are arranged on the front and rear sides, respectively, the substrate 20 is taller than the substrate 21, and the substrate 21 has a lateral width larger than that of the substrate 20. The substrate 20 and the substrate 21 are integrated with each other such that the bottom-side portion and the right-side portion are aligned with each other, and a portion of the substrate 20 upwardly sticking out of the substrate 21 is defined as a projection end portion 23, and a portion of the substrate 21 sticking out of the substrate 20 on the left-side portion side is defined as a projection end portion 24.

The sealing material 22 consisting of a resin is interposed between the substrate 20 and 21 such that the sealing material 22 is sandwiched by the substrates 20 and 21 along the corners of the overlapping portions of the substrates 20 and 21. The sealing material 22 is constituted by an annular portion 22a arranged in the form of an almost rectangularly annular shape along the peripheral portions of the overlapping portions of the substrates 20 and 21, extension portions 22b are almost parallel and are spaced apart from each other on the central portions of the substrates 20 and 21 toward the right sides of the substrates 20 and 21 to form a liquid crystal injection portion 26 formed on the right side of the substrates 20 and 21, and a sealed portion 22c formed by stopping up the injection portion 26. To the inner side of the injection portion 26, a linear bank member 27 consisting of a resin having a length almost equal to the width of the injection portion 26 is arranged almost parallel to the right side of the substrate 20. The bank member 27 is sandwiched by the substrates 20 and 21.

A large number of stripe-shaped display electrodes are formed parallel on the opposite surfaces of the substrates 20 and 21 inside the sealing material 22. The large number of display electrodes formed on the substrate 20 and the large number of display electrodes formed on the substrate 21 are arranged opposite to each other at angles of 90° arranged in the form of a matrix. A rectangular electrode forming region 30 which is slightly smaller in area than the area of the annular sealing material 22 is formed inside the sealing material 22.

On the surface of the projection end portion 23 of the substrate 20 on the substrate 21 side, drawn electrodes 23a drawn from the large number of display electrodes are formed in an array. On the surface of the projection end portion 24 of the substrate 21 on the substrate 20 side, drawn electrodes 24a drawn from the large number of display electrodes are also formed in an array. These drawn electrodes 23a and 24a are used to attach a drive IC or the like of the liquid crystal display device thereto.

More specifically, in addition to the electrode layers, overcoat layers and alignment films are stacked on the opposite surface sides of the substrates 20 and 21, a color filter is further arranged when a color display is performed. However, in the description of this embodiment, descriptions of these parts are omitted.

On the almost entire surface of the substrate 21 (lower substrate) on the outer side, a metal reflective film 31 consisting of Al or the like deposited. In the metal reflective film 31, an unformed region 31a of the metal reflective film is formed on a portion corresponding to the liquid crystal injection portion 26, and an unformed portion 31b of a metal reflective film is formed on a portion corresponding to the drawn electrode forming region of the substrate 21.

The unformed region 31a of the metal reflective film has a shape obtained by forming a rectangular notched portion in the metal reflective film 31. The longitudinal width of the unformed region 31a (length parallel to the short side of the substrate 21 in FIG. 1) is made larger than the longitudinal width of the liquid crystal injection portion 26 and smaller than the longitudinal width of the substrate 20. The unformed region 31a is formed to have such a lateral width (length parallel to the long side of the substrate 21 in FIG. 1) that the unformed region 31a extends from the right side end (exit portion of the injection portion 26) of the substrates 20 and 21 to a position between the bank member 27 and the electrode forming region 30.

The unformed portion 31b of the metal reflective film has a shape obtained by forming a rectangular notched portion in the metal reflective film 31. The longitudinal width of the unformed portion 31b (length parallel to the short side of the substrate 21 in FIG. 1) is made slightly larger than that of the forming region of the drawn electrodes 24a and equal to or smaller than the short side of the substrate 21. The unformed region 31a is formed to have such a lateral width (length parallel to the long side of the substrate 21 in FIG. 1) that the unformed portion 31b extends from the left-side portion of the substrate 21 to a position before the electrode forming region 30 over the annular portion 22a.

In the liquid crystal display device A' having the structure shown in FIG. 1, the structure is preferably manufactured in the following manner. The substrates 20 and 21 are adhered to each other through the sealing material 22, and an operation of injecting a liquid crystal from the liquid crystal injection portion 26 into a space surrounded by the substrates 20 and 21 and the sealing material 22 is performed, and the injection portion 26 is sealed with a resin.

Figure 10:
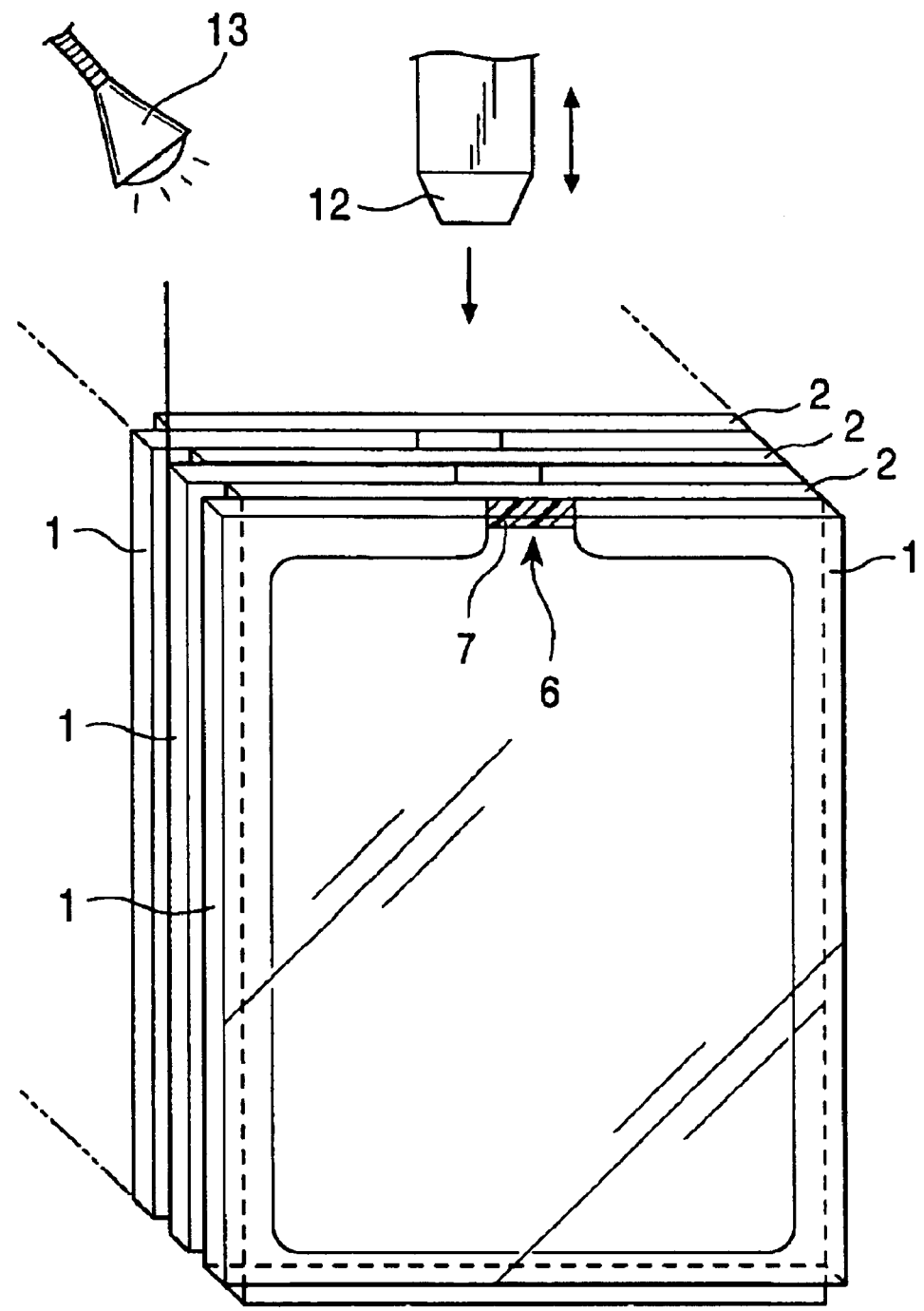
FIG. 10 is a perspective view showing a state in which a resin is injected into a liquid crystal injection hole in the processes of manufacturing the conventional liquid crystal display device shown in FIGS. 7 and 8.

More specifically, as in the conventional case described with reference to FIG. 10, pairs of substrates 20 and 21 are vertically arranged in an array, and a resin is sequentially injected into the liquid crystal injection portions 26 of the substrates 20 and 21 to form the sealed portions 22c, and the injection portions 26 are thereafter closed. In this case, the positions of the injection portions 26 can be easily checked from the outside because the unformed regions 31a of the metal reflective films exist around the injection portions 26. Therefore, in either one of a case in which the plurality of injection portions 26 are visually checked, and a case in which the plurality of injection portions 26 are checked by an imaging device such as a television camera, it can be easily checked whether the injection portions 26 can be reliably stopped up by the resin sealed portions 22c from the outside of the arrayed substrates 1 and 2.

Since the bank member 27 is formed inside the liquid crystal injection portion 26, the injected resin is retained by the bank member 27, reliably spreads on the inside of the injection portion 26, and is filled in the injection portion 26. For this reason, if the filling state is checked, it can be easily determined whether the injection portion 26 is completely sealed. The filling state of the injected resin can also be easily checked by a visual check or the like from the outside or by an image analyzer or the like because of the unformed region 31a.

Since the unformed portion 31b of the metal reflective film formed on the end side of the substrate 21 conceals the drawn electrodes 24a of the display electrodes, when a drive IC or the like is connected to the drawn electrodes 24a, the connection portions between the IC and the drawn electrodes 24a are not concealed from the rear surface side of the substrate 21.

In addition, although defective liquid crystal injection may occur in the process of injecting a liquid crystal, before the injection portion 26 of the substrates 20 and 21 having the defective liquid crystal injection is sealed, the injection portion 26 can be easily checked by a visual check or an image analyzer through the unformed region 31a. For this reason, a sealing operation is not performed to the substrates 20 and 21, and the substrates 20 and 21 can be sealed after a liquid crystal injection operation is performed again. Therefore, the substrates 20 and 21 in which defective liquid crystal injection occurs can be prevented from being sealed, and a defective product can be prevented from being manufactured.

In order to form the metal reflective film 31 having the configuration described above on the rear surface side of the substrate 21, for example, resists are formed on portions corresponding to the unformed region 31a of the metal reflective film and the unformed portion 31b of the metal reflective film on the substrate 21, and Al is deposited. After an Al deposition film is formed, the resists are peeled and removed. In this manner, the metal reflective film 31, the unformed region 31a, and the unformed portion 31b can be formed at desired positions of the substrate 21.

Figure 2:
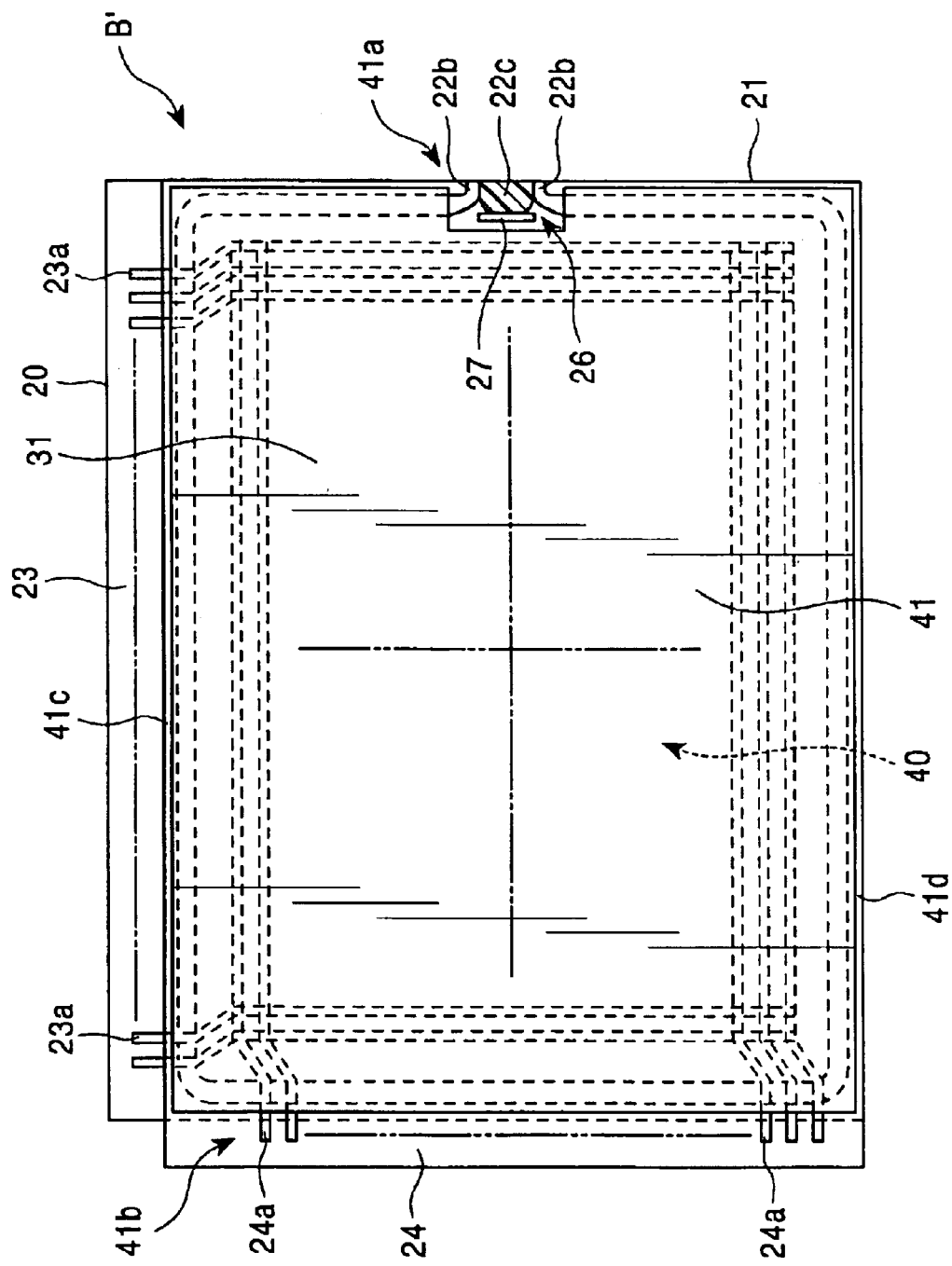
FIG. 2 is a side view showing a liquid crystal display device according to the second embodiment of the present invention.

FIG. 2 shows the second embodiment obtained by applying the present invention to a simple matrix drive type liquid crystal display device. The same reference numerals as in the liquid crystal display device A' shown in FIG. 1 denote the same components in a liquid crystal display device B' shown in FIG. 2, and a description thereof will be omitted.

The liquid crystal display device B' shown in FIG. 2 has a metal reflective film having a shape different from that in the liquid crystal display device A' shown in FIG. 1. The metal reflective film 41 in this embodiment is formed on the rear surface side of the substrate 21 as in the previous embodiment. In addition to the same region as the unformed region 31a of the previous embodiment, an unformed region 41a of the metal reflective film which occupies a region extending a position near the annular portion 22a of the sealing material 22 to the right end of the substrate 21 is formed. An unformed portion 41b of the metal reflective film corresponding to the almost entire area of the projection end portion 24 of the substrate 21 is formed on the left end side of the substrate 21. In this embodiment, the metal reflective film 41 is formed to cover a display electrode forming region 40 and the annular portion 22a of the sealing material formed around the display electrode forming region 40. However, in FIG. 2, both the peripheral portions of the metal reflective film 41 on the bottom side and the upper side of the substrate 21 are formed up to a slightly inside a of the outer edge portion of the substrate 21, and unformed regions 41c and 41d are formed on the upper edge portion and the lower edge portion of the substrate 21, respectively.

As in the structure shown in FIG. 2, since the unformed region 41a makes it possible to visually recognize a portion around the liquid crystal injection portion 26, just like the previous embodiment, when operations of vertically arranging pairs of substrates 20 and 21 in an array, sequentially injecting a resin into the liquid crystal injection portions 26 of the substrates 20 and 21, forming the sealed portions 22c, and stopping up the injection portions 26 are performed, the positions of the injection portions 26 can be easily checked. Therefore, when the injection portions 26 are visually checked or checked by an imaging device such as a television camera. In any case, it can be easily checked whether the injection portions 26 can be reliably stopped up by the resin sealed portion 22c.

Since the unformed region 41a of this embodiment has a width larger than that of the unformed region 31a of the first embodiment, the second embodiment has the following characteristic feature. That is, when the plurality of injection portions 26 are checked from the outside while the plurality of substrates are uprightly arrayed as in the case shown in FIG. 10, the resin injection states of the injection portions 26 can be easily checked from a range wider than that of the structure of the first embodiment.

Figure 3A:
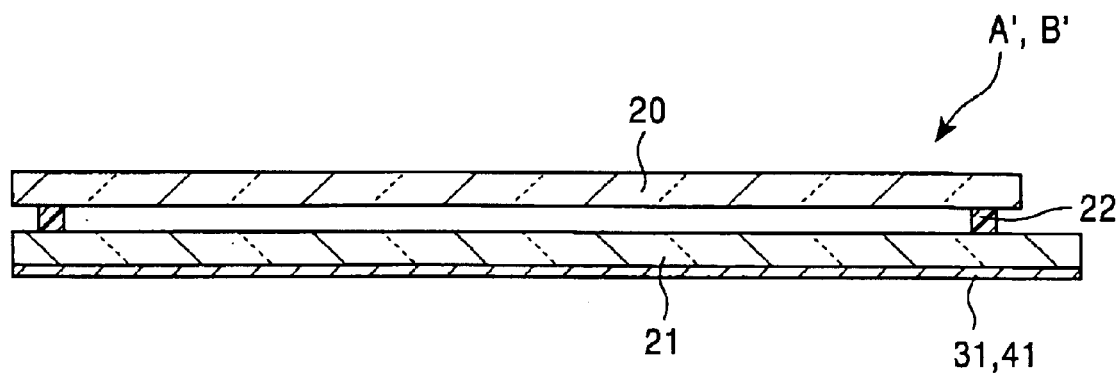
FIG. 3A is a sectional view of the liquid crystal display device according to the first embodiment of the present invention.
Figure 3B:
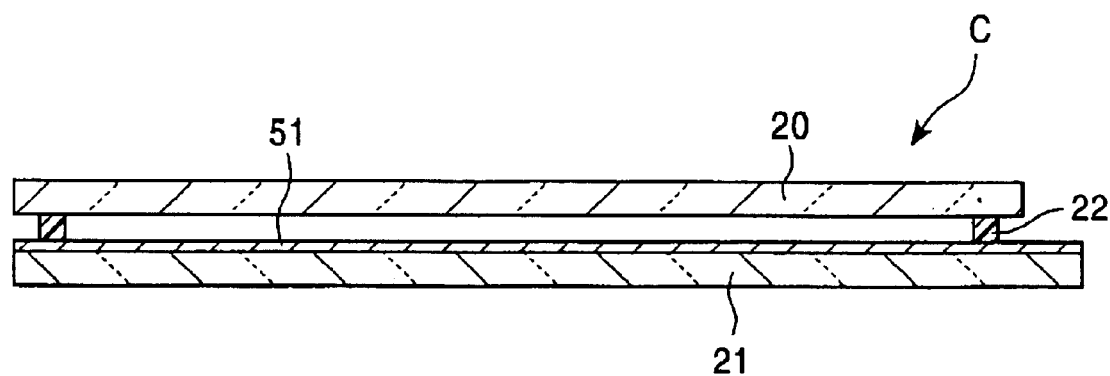
FIG. 3B is a sectional view showing a liquid crystal display device according to the third embodiment of the present invention.

FIGS. 3A and 3B are used to explain a forming position of a metal reflective film. In either one of the liquid crystal display device A' of the first embodiment described above and the liquid crystal display device B' of the second embodiment, the metal reflective film 31 or the metal reflective film 41 is formed on the rear surface side of the substrate 21. However, such a structure has a sectional structure as shown in FIG. 3A.

In contrast to this, as a structure in which a metal reflective film is formed on the surface of the substrate 21 on the liquid crystal side as shown in FIG. 3B, the metal reflective film 51 is formed to have one of the planar shapes shown in FIG. 1 and FIG. 2, so that a liquid crystal display device C can also be constituted.

The liquid crystal display device C according to the third embodiment having the above structure is structured such that the metal reflective film 51 is incorporated in the substrate. For this reason, when electrodes, an overcoat layer, a color filter layer, and the like are formed on the metal reflective film 51 incorporated in the substrate 21 described above, the liquid crystal display device C shown in FIG. 3B can be constituted.

In the structure shown in FIG. 3A, respective layers such as electrode layers, color filter layers, and alignment layers stacked on the opposite surface sides of the substrates 20 and 21 are omitted. In the structure shown in FIG. 3B, layers such as electrode layers, color filter layers, and alignment layers stacked on the metal reflective film 51 and the opposite surface side of the substrate 20 are omitted.

Figure 4:
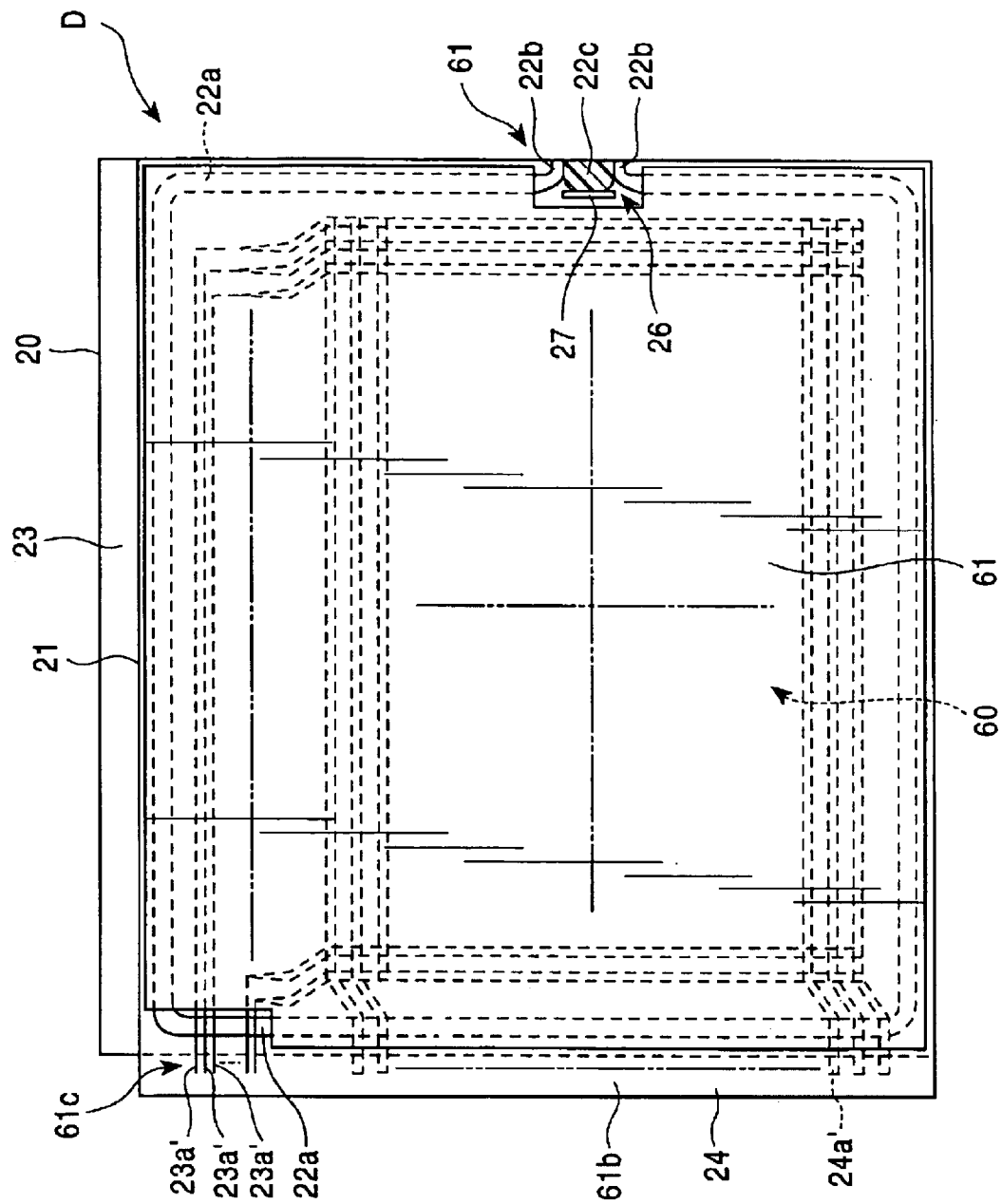
FIG. 4 is a side view showing a liquid crystal display device according to the fourth embodiment of the present invention.

FIG. 4 to FIG. 6 show the fourth embodiment obtained by applying the present invention to a simple matrix drive type liquid crystal display device. The same reference numerals as in the liquid crystal display device A' shown in FIG. 1 denote the same components in a liquid crystal display device D shown in FIG. 4 to FIG. 6, and a description thereof will be omitted.

The liquid crystal display device D of this embodiment has one characteristic feature described below. That is, drawn terminals 23a' connected to display electrodes formed on the substrate 20 are formed on the projection end portion 24 of the substrate 21, not formed on the projection end portion 23 side of the substrate 20. In this case, first drawn electrodes (drawn terminals) 24a' for the display electrodes of the substrate 21 are formed in an array on the projection end portion 24 of the substrate 21. However, on an end side on which the first drawn electrodes 24a' are formed, for example, on the side near the projection end portion 23 of the substrate 20 on the projection end portion 24 of the substrate 21, the plurality of second drawn terminals 23a' (drawn terminals) are formed in an array.

On the right end side of a metal reflective film 61 formed on the rear surface side of the substrate 21 of this embodiment, an unformed region 61a having the same shape as that of the unformed region 41a of the second embodiment described above is formed. The unformed region 61a is formed such that, due to the existence of the unformed region 61a, the liquid crystal injection portion 26 and a portion therearound can be seen from the rear surface side of the substrate 21, and the entire area of the right end side of the substrate 21 can be easily visually checked from the rear surface side of the substrate 21. On the left end side of the metal reflective film 61, an unformed portion 61b corresponding to an almost entire area of the projection end portion 24 of the substrate 21 and also corresponding to the portion inside the forming region of the second drawn terminals 23a' is formed. The unformed portion 61b is formed such that the entire area of the projection end portion 24 and the inside portion of the second drawn terminals 23a' can be easily visually checked from the rear surface side of the substrate 21. The inside portion of the second drawn terminals 23a' means a portion around the annular portion 22a of the sealing material 22 located inside the second drawn terminals 23a'. An extension portion 61c of the unformed portion 61b is formed to correspond to the inside portion.

The structure of connection portions between the display electrodes of the substrate 20 and the second drawn terminals 23a' will be described below on the basis of a liquid crystal display device D', in which the metal reflective film 61 is incorporated, according to the embodiment shown in FIG. 5A.

Figure 5A:
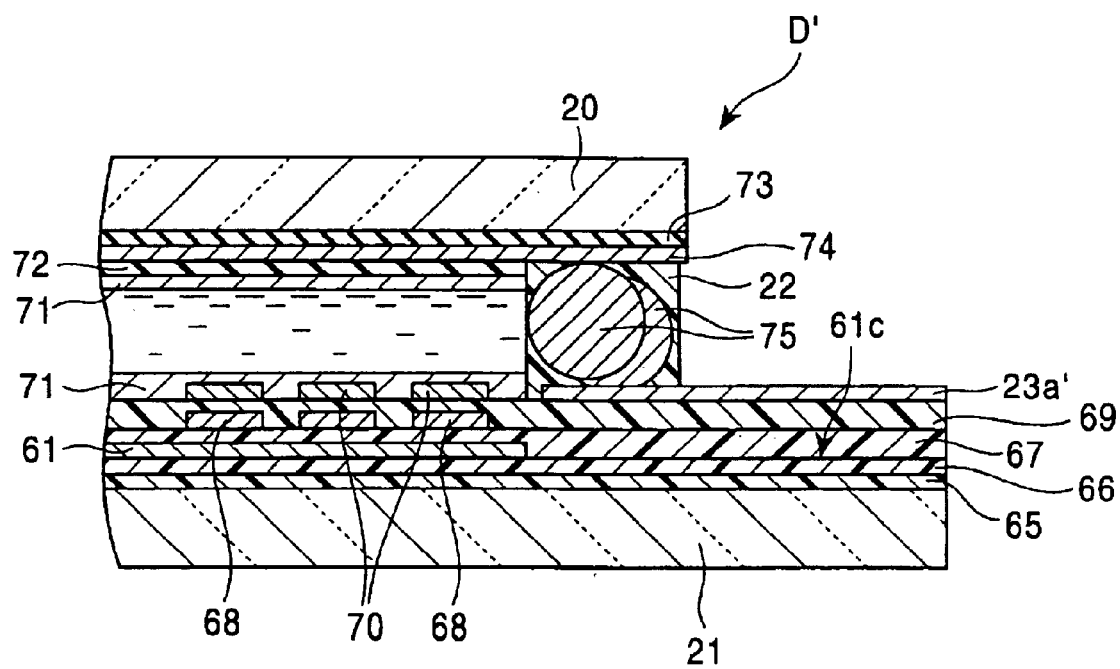

In the structure of this embodiment, as shown in FIG. 5A, an insulating layer 65, a resin layer 66, and a resin layer 67 are stacked on the substrate 21, and the metal reflective film 61 is incorporated in a portion corresponding to a display region on the center portion side of the resin layer 67, and color filters 68 are formed in the display region of the resin layer 67. A flat film 69 which consists of a resin and covers the color filters 68 and the resin layer 67 is formed, stripe-shaped electrodes 70 are formed on the flat film 69 on the color filters 68, and an alignment film 71 is formed to cover the stripe-shaped electrodes 70 in the display region. An insulating layer 73 is formed on the lower surface side of the substrate 20, stripe-shaped electrodes 74 are formed on the lower surface side of the insulating layer 73 in a direction vertical to the electrodes 70 on the substrate 21 side, and an insulating film 72 and the alignment film 71 are stacked to cover the electrodes 74 in the display region. The stripe-shaped electrodes 74 are formed such that the ends of the stripe-shaped electrodes 74 are extended to reach the sealing material 22, and a large number of drawn terminals 23a' are formed on the flat film 69 on the substrate 21 side such that the drawn electrodes 23a' are directed from the position of the sealing material 22 toward the outside and extend to the outside parallel to the electrodes 74 on the substrate 20 side. A large number of conductive particles 75 are diffused into the sealing material 22, and the electrodes 74 are connected to the drawn terminals 23a' through the conductive particles 75.

Figure 6A:
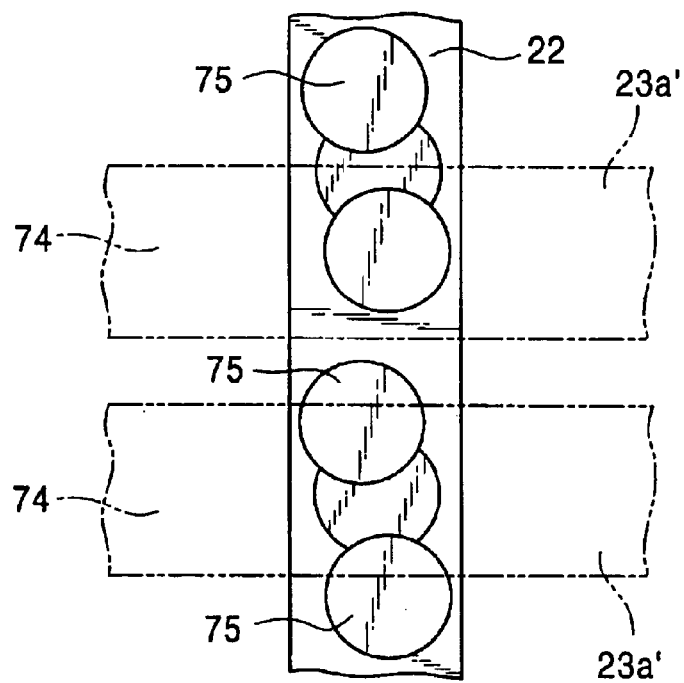

When a proper number of conductive particles 75 constituting the sealing material 22 and having appropriate particle sizes are diffused into the region constituting the sealing material 22, as shown in FIG. 5A or FIG. 6A, the electrodes 74 are electrically connected to the drawn terminals 23a' in the thickness direction of the sealing material 22, and adjacent electrodes 74 are prevented from being short-circuited in the surface direction.

As the conductive particles 75 in the above configuration, particles obtained by forming conductive films consisting of Au or Cu on the outer surfaces of resin micro balls can be used. When resin micro balls cannot be directly Au-plated or Cu-plated, the micro balls may be plated with another conductive material such as Ni in advance by a method such as electroless plating and Au-plated, and the resultant micro balls may be Au-plated.

When the connection structure described on the basis of FIG. 5A and FIG. 6A is employed, the structure of the liquid crystal display device D having the structure shown in FIG. 4 can be realized. When the structure of this embodiment is used, the drawn electrodes 23a' and 24a' can be arranged on only the end side of the substrate 21. For this reason, a drive IC or the like is to be connected, a connection operation may be performed to only one substrate 21. Therefore, an operation of attaching a drive IC in this structure is easier than that in a structure in which a drive IC must be attached to both the substrates 20 and 21.

In the structure shown in FIGS. 5A and 6A, the shape of the metal reflective film 61 has basically the same structure as that shown in FIG. 4. Therefore, the unformed region 61c of the metal reflective film 61 is formed on a position where the second drawn terminals 23a' are arranged. However, when the unformed region 61c is formed, the following advantages can be achieved.

In this embodiment, the electrodes 74 on the substrate 20 side and the drawn terminals 23a' on the substrate 21 side are connected to each other by the conductive particles 75 diffused in the sealing material 22. However, in order to arrange the conductive particles 75 in the sealing material 22 to connect the stripe-shaped electrodes 74 to the drawn terminals 23a', after the sealing material 22 is coated on a substrate, an operation of pressing the substrates 20 and 21 on each other in a closing direction to join the substrates 20 and 21 to each other must be performed.

In the joining operation, the conductive particles 75 are brought into reliable contact with the electrodes 74 and the drawn terminals 23a' to reliably render the conductive particles 75, the electrodes 74, and the drawn terminals 23a' conductive. In this case, the conductive particles 75 are pressed on both the substrates 20 and 21 with strong force on a portion where the conductive particles 75 exist at a high concentration depending on the diffusion state of the conductive particles 75. As a result, the conductive particles 75 may press and break through the drawn terminals 23a', the flat film 67, and the resin layer 69 on the substrate 21 to reach the resin layer 66 as shown in FIG. 5B.

Figure 5B:
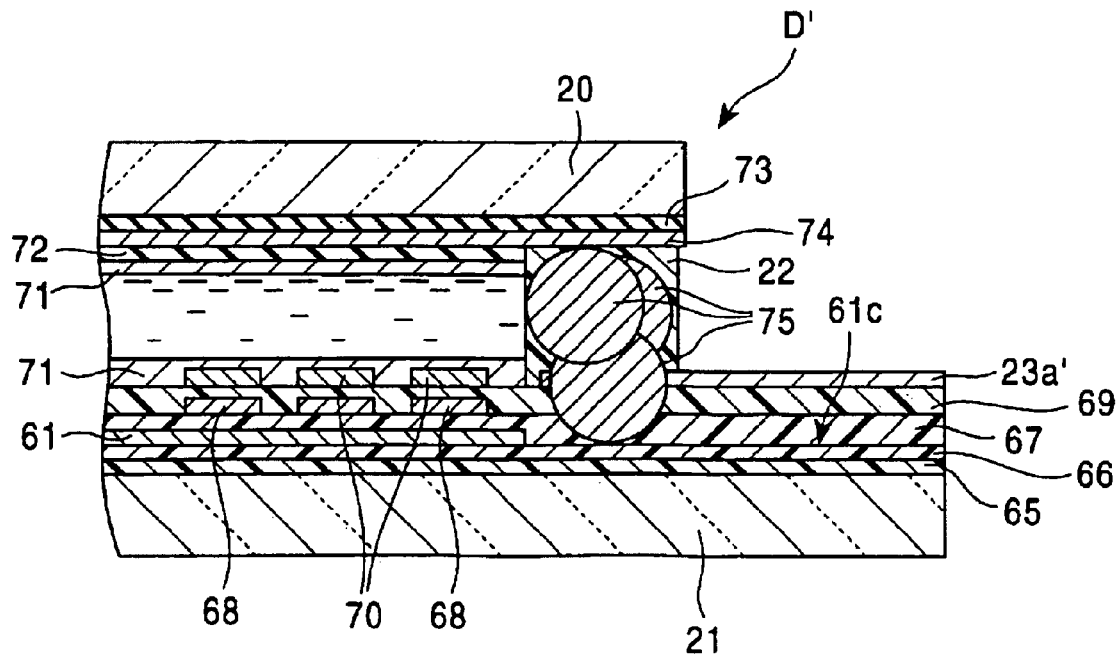

In this case, when a structure in which the unformed region 61c of the metal reflective film 61 is formed as in this embodiment is used, as shown in FIG. 5B, if the conductive particles 75 press and break through the drawn terminals 23a', the flat film 67, and the resin layer 69 to reach the resin layer 66, a problem such as a short circuit is not posed. In contrast to this, if a structure in which the unformed region 61c is formed in the metal reflective film 61 is used, electrodes may be short-circuited.

Figure 6B:
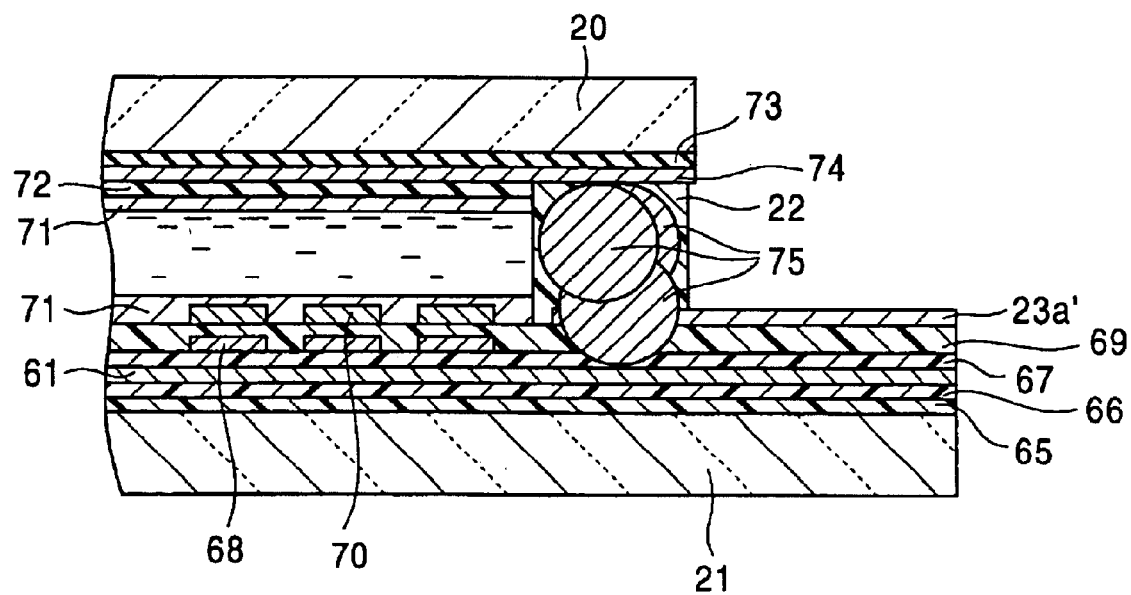
Figure 7:
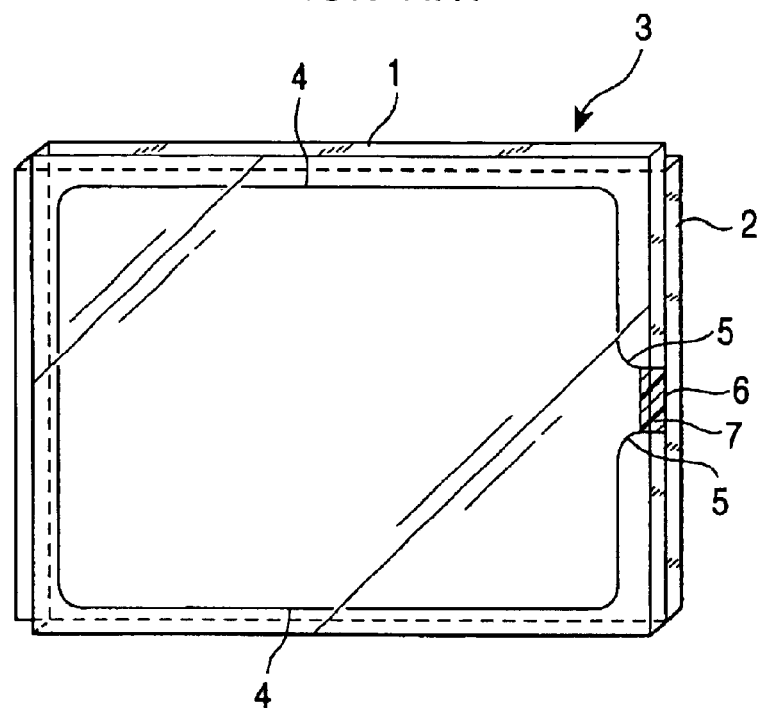
FIG. 7 is a perspective view showing a structure of a conventional liquid crystal display device.
Figure 8:
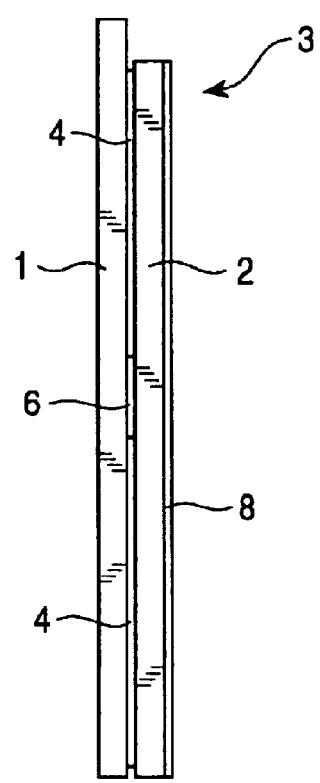
Figure 9:
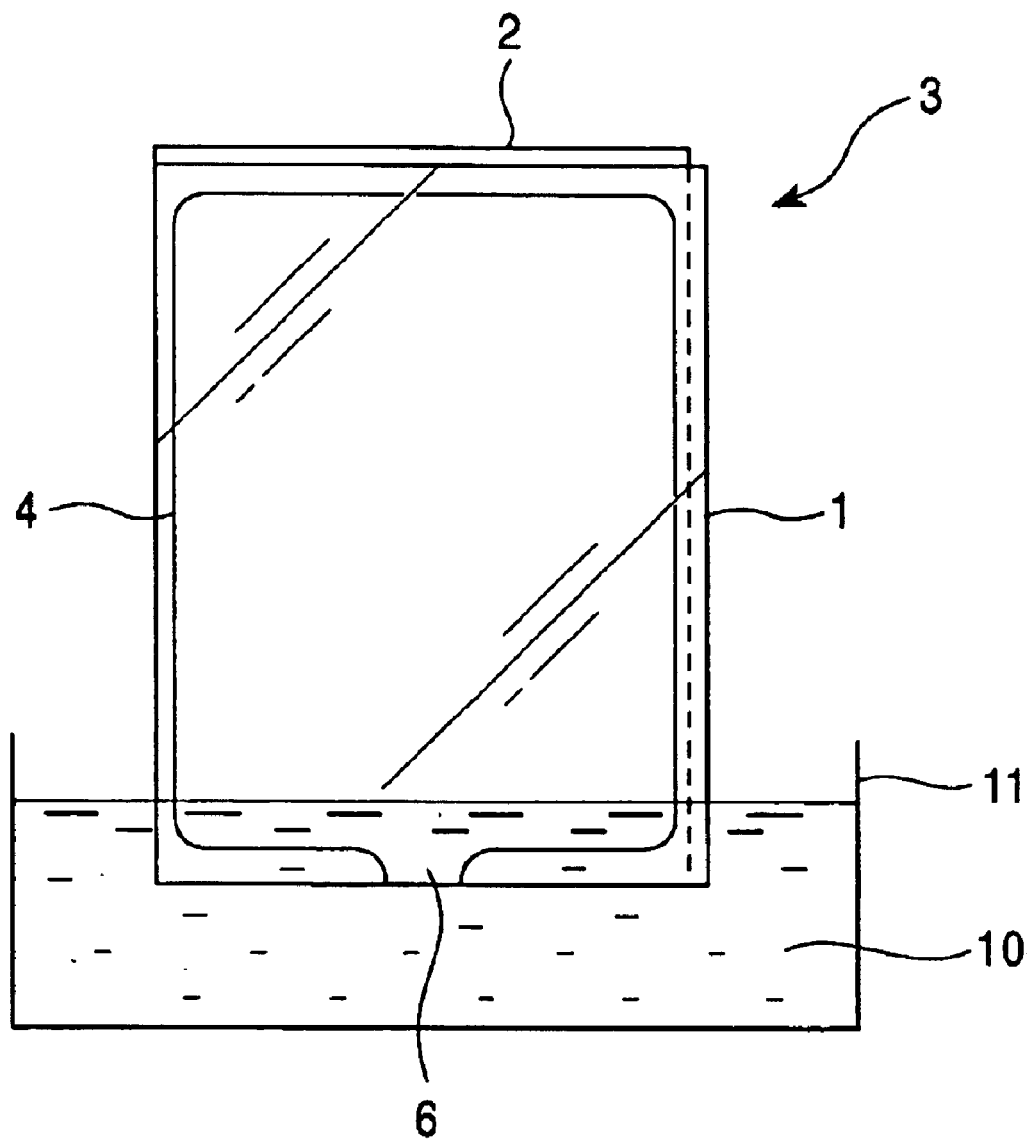
FIG. 9 is a plan view showing a state in which liquid crystal injection is performed in the processes of manufacturing the conventional liquid crystal display device shown in FIG. 8.

When the conductive particles 75 reach the metal reflective film 61 in the structure in which the unformed region 61c is not formed as shown in FIG. 6B, the metal reflective film 61 is short-circuited to the drawn terminals 23a'. The structure is not preferable. When the unformed region 61c is formed in the metal reflective film 61 as described above, the metal reflective film 61 and the drawn terminals 23a' can be advantageously prevented from being short-circuited to each other.

EXAMPLE

As conductive particles, micropearls (tradename: Micropearl Au available from Sekisui Fine Chemical Co., Ltd.) obtained by performing conductive plating to plastic particles were applied.

A mixture of 100 weight parts of sealing resin (thermosetting epoxy resin), 1.5 weight parts of glass fiber spacer (6.5 $\mu$m$\phi$), and 2 weight parts of Au-plated micropearl (tradename: XN-5A6.75 $\mu$m$\phi$ available from Mitsui Toatsu Chemicals, Inc.) was used as a sealing resin to constitute a sealing material. In-cell-diffusion micropearls (6.38 $\mu$m$\phi$) diffused between the substrates 20 and 21 to uniform intervals between the substrates 20 and 21 were used at a rate of 120 particles/mm$^2$, and a liquid crystal display device having the sectional structure shown in FIGS. 5A and 5B was assembled. As a result, the concentration of the Au-plated micropearl in the sealing material could be made 400±150 particles/mm$^2$.

In the substrate connection structure of the liquid crystal display device using the sealing material having the concentration and the structure described above, of electrodes formed on a pair of substrates, each having a drawn electrode with of 40 $\mu$m, arranged at drawn electrode intervals of 30 $\mu$m, adjacent electrodes in the substrate surface direction were not short circuited, and the electrodes of both the substrates which were opposite to each other in the thickness direction of the sealing material could be electrically connected to each other through the sealing material.

As the metal reflective film, an Al diffusion film formed on the rear surface side of the substrate was used. The unformed region and the unformed portion of the Al deposition film could be obtained by the following manner. That is, resists were formed on positions corresponding to the unformed region and the unformed portion on the substrate, Al was deposited, and the resists were peeled and removed after an Al deposition film was formed.

When, as the unformed region of the reflective film having the structure shown in FIG. 4, a recessed portion surrounding the injection portion 26 and having a vertical width of 1 mm and a lateral width of 12 mm was formed, even if ten pairs of liquid crystal display devices were uprightly arrayed, existence of the injection portions could be easily visually checked from the outside.

As has been described above, according to the present invention, since the unformed region of the metal reflective film is formed on a portion including the injection portion of the sealing material outside the display electrode forming region, the position of the liquid crystal injection portion can be easily checked from the outside through the metal reflective film. Therefore, after a liquid crystal is injected from the injection portion of the sealing material into a portion between substrates, when operations of uprightly arraying a large number of substrates, sequentially injecting a resin into a large number of injection portions, and stopping up the injection portions are performed, the positions of the injection portions can be seen without being disturbed by the metal reflective films of other adjacent substrates.

Therefore, since the positions of the injection portions obtained by resin injection can be correctly checked, the operation of stopping up the injection portions can be easily and reliably performed. Since the resin filled in the injection portions can be easily checked from the outside of the substrates through the metal reflective films of the plurality of substrates, it can be easily checked by a visual check or an imaging analyzer such as a television camera whether the liquid crystal injection portions of the sealing materials can be completely sealed with resin, and defectiveness such as leakage of a liquid crystal in the liquid crystal sealing process can be prevented.

Even if uneven injection or the like occurs in the liquid crystal injection process to cause defectiveness, the uneven liquid crystal injection can be easily checked before the injection portion is sealed with resin. Resin sealing is stopped, liquid crystal injection is performed again, and the injection portion can be sealed. For this reason, probability that the substrates in which uneven injection occurs are sealed with resin can be reduced. Defectiveness can be prevented from occurring, and an advantage that an increased yield can be obtained.

In addition, according to the present invention, drawn electrodes for display electrodes are formed on one side edge outside the display electrode forming region of one substrate, and the unformed portion of the metal reflective film is formed in the drawn electrode forming region. For this reason, drawn electrodes can be easily formed without being disturbed by the metal reflective film, and the terminals of a drive IC or the like can be easily and reliably connected.

According to the present invention, since second drawn electrodes of one substrate and display electrodes of the other substrate are connected to each other through an electrode connection means of a sealing material, metal reflective films do not exist on the connection portions, and the connection portions can be easily formed. When a drive IC or the like is joined to the drawn electrodes, the connection portions can be easily checked without being disturbed by the metal reflective film.

Outside the display electrode forming region on one substrate of the structure described above, an unformed region of the metal reflective film may be formed on a portion including an injection portion of a sealing material.

Since the unformed region of the reflective film is formed on the portion including the injection portion of the sealing material, the position of the injection portion can be easily checked. Therefore, when operations of uprightly arraying a large number of substrates, sequentially injecting a resin into a large number of injection portions, and stopping up the injection portions are performed, the positions of the injection portions can be easily seen without being obscured by the reflective films on the other adjacent substrates. For this reason, the injection portions can be easily and reliably stopped up by liquid crystal injection.

A configuration characterized in that the unformed portion of the metal reflective film is formed in the drawn electrode forming region outside the display electrode forming region on one of the substrates may be used.

The electrode connection means arranged on the sealing material is preferably constituted by conductive particles added to a resin constituting the sealing material.

If the sealing material has a configuration in which conductive particles are diffused in a resin, one substrate and the other substrate are brought into tight contact with each other to sandwich the sealing material, so that the electrodes formed on one substrate and the electrodes formed on the other substrate can be connected through the conductive particles in the sealing material.

As to conductive particles in the sealing material, conductive particles (i.e., conductive particles existing in the thickness direction of the substrates or the sealing material) are sandwiched by the electrodes of a pair of substrates to be in contact with these electrodes, thereby electrically connecting the electrodes to each other. However, since conductive particles existing in the surface direction of the substrates are spaced apart from each other, the electrodes adjacent to each other in the substrate surface direction are not short-circuited.

Therefore, the electrodes of the substrates which are opposite to each other in the thickness direction of the sealing material are connected together without short-circuiting the electrodes which are adjacent to each other in the surface direction of the substrates.

In addition, when a structure in which an unformed region of a metal reflective film is formed is used, if conductive particles press and break through drawn electrodes and other films on the substrate to reach the inside of the structure, any problem that the metal reflective film and the drawn electrodes are short-circuited to each other is not posed because the metal reflective film does not exist on the portion where the conductive particles reach.

What is claimed is:

1. A liquid crystal display device comprising a first substrate, a second substrate arranged opposite to the first substrate, a sealing material interposed between the pair of substrates for surrounding, together with the substrates, a liquid crystal injection space formed between the substrates, and a liquid crystal that has been deposited into and sealed within the liquid crystal injection space, wherein a liquid crystal injection portion is formed in the sealing material through which the liquid crystal has been deposited into the liquid crystal injection space, a plurality of display electrodes are formed on a surface of one of said first substrate and said second substrate, said display electrodes being formed adjacent to the liquid crystal that has been deposited into the liquid crystal injection space, and a metal reflective film that has been formed on a surface of one of said first substrate and said second substrate, said metal reflective film being spaced apart from the display electrodes, and wherein the metal reflective film has not been formed on a portion of the surface that is adjacent to the injection portion in the sealing material, said portion of the substrate where the metal reflective film has not been formed providing an inspection area for the visual inspection of the injection portion in the sealing material.

2. A liquid crystal display device comprising a pair of substrates which hold a liquid crystal therebetween, a plurality of display electrodes formed on a surface of the substrates in a display electrode region that is disposed adjacent to the liquid crystal, drawn electrodes of the display electrodes formed in a drawn electrode region at an edge of the substrates outside the display electrode region, and a metal reflective film formed on one of the pair of substrates, said metal reflective film being formed on a first portion of the substrate that is adjacent to the display electrode region and not being formed on a second portion of the substrate that is adjacent to the drawn electrode region, said second portion of the substrate where the metal reflective film has not been formed providing an inspection area for the visual inspection of the drawn electrode region, the metal reflective film also not being formed in an inspection area for the visual inspection of an injection portion in sealing material of the liquid crystal display device.

3. A liquid crystal display device comprising a first substrate on which a metal reflective film is formed, a second substrate arranged opposite to the first substrate, a sealing material interposed between the pair of substrates for surrounding, together with, the substrates, a liquid crystal injection space formed between the substrates, and a liquid crystal that has been deposited into and sealed within the liquid crystal injection space, wherein

- a liquid crystal injection portion is formed in the sealing material through which the liquid crystal has been deposited into the liquid crystal injection space,
- a plurality of display electrodes are formed on a surface of one of said first substrate and said second substrate, said display electrodes being formed adjacent to a region in which the liquid crystal has been deposited and sealed,
- a first drawn electrode for a display electrode for one of the substrates, and a second drawn electrode for a display electrode of the other of the substrates, are formed at an edge of one of the substrates,
- an electrode connection means is arranged on the sealing material, the second drawn electrode and the display electrode of the other of the substrates being connected to each other by the electrode connection means, and
- further wherein the metal reflective film is not formed on the first substrate in a region in which the second drawn electrode and the display electrode of the other of the substrates are connected to each other on the sealing material, said region of the first substrate where the metal reflective film is not formed providing an inspection area for the visual inspection of the connection between the second drawn electrode and the display electrode, the metal reflective film also is not formed on a portion of the substrate that is adjacent to the injection portion of the sealing material, sand portion of the substrate where the metal reflective film has not been formed providing an inspection area for the visual inspection of the injection portion in the sealing material.

4. A liquid crystal display device according to claim 3, wherein the metal reflective film is not formed on a portion of the substrate that is adjacent to a first drawn electrode forming region and a second drawn electrode forming region, said portion of the substrate where the metal reflective film has not been formed providing an inspection area for the visual inspection of the first drawn electrode forming region and the second drawn electrode forming region.

5. A liquid crystal display device according to claim 3, wherein the electrode connection means arranged on the sealing material consists of conductive particles added to the region constituting the sealing material.

* * * * *

UNITED STATES PATENT AND TRADEMARK OFFICE
CERTIFICATE OF CORRECTION

| | |
|---|---|
| PATENT NO. | : 6,798,485 B2 |
| APPLICATION NO. | : 09/334387 |
| DATED | : September 28, 2004 |
| INVENTOR(S) | : Takashi Date et al. |

It is certified that error appears in the above-identified patent and that said Letters Patent is hereby corrected as shown below:

In the Claims

Column 15, in claim 3, line 5, immediately after "together with" delete "," (comma).

Signed and Sealed this

Seventh Day of November, 2006

JON W. DUDAS
*Director of the United States Patent and Trademark Office*